United States Patent
Lei et al.

(10) Patent No.: US 8,985,671 B1
(45) Date of Patent: Mar. 24, 2015

(54) V SHAPE BUMPER EXTENSION

(71) Applicant: Ford Global Technologies, LLC, Dearborn, MI (US)

(72) Inventors: Wanjun Lei, Ann Arbor, MI (US); Yi Qu, Troy, MI (US); Chris Stephen O'Connor, Livonia, MI (US); Naeem Ahmed Ghias, Canton, MI (US); Erika Kristin Low, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/059,659

(22) Filed: Oct. 22, 2013

(51) Int. Cl.
*B60R 19/34* (2006.01)
*B60R 19/18* (2006.01)

(52) U.S. Cl.
CPC ................ *B60R 19/18* (2013.01); *B60R 19/34* (2013.01)
USPC ..................................... 296/133; 296/187.09

(58) Field of Classification Search
CPC .. B60R 2019/1886; B60R 19/18; B60R 19/34
USPC .............. 296/187.1, 187.09, 203.02, 203.03, 296/193.09; 293/102, 131, 132, 133, 151, 293/155, 154, 126
See application file for complete search history.

(56) References Cited

U.S. PATENT DOCUMENTS

| | | | |
|---|---|---|---|
| 3,717,223 A | 2/1973 | Alfes | |
| 5,785,367 A | 7/1998 | Baumann et al. | |
| 6,174,009 B1 | 1/2001 | McKeon | |
| 6,554,332 B1 | 4/2003 | Schuster et al. | |
| 6,695,368 B1 | 2/2004 | Weykamp et al. | |
| 7,422,252 B2 | 9/2008 | Gouillart et al. | |
| 8,414,041 B2 | 4/2013 | Paare et al. | |
| 8,608,231 B1 * | 12/2013 | Mendivil et al. | 296/187.03 |
| 2002/0000729 A1 * | 1/2002 | Phillips et al. | 293/142 |
| 2005/0156443 A1 | 7/2005 | Suzuki et al. | |
| 2009/0045638 A1 | 2/2009 | Handing et al. | |
| 2009/0160204 A1 | 6/2009 | Czopek et al. | |
| 2012/0248820 A1 * | 10/2012 | Yasui et al. | 296/187.09 |
| 2012/0313398 A1 * | 12/2012 | Shin et al. | 296/187.1 |
| 2013/0069377 A1 * | 3/2013 | Qu et al. | 293/133 |
| 2014/0008924 A1 * | 1/2014 | Han et al. | 293/133 |
| 2014/0091585 A1 * | 4/2014 | Ramoutar et al. | 293/133 |

FOREIGN PATENT DOCUMENTS

DE 19744274 A1 4/1999

* cited by examiner

*Primary Examiner* — Pinel Romain
(74) *Attorney, Agent, or Firm* — Jason Rogers; Bejin Bieneman PLLC

(57) ABSTRACT

A V shape bumper extension for a vehicle is provided where the V shape member has an extension member and a support member. The extension member extends linearly away from a bumper and the support member is positioned at an acute angle with respect to a crush can. The support member includes an outer edge spaced apart from the crush can and is connected to the crush can through at least one breakable attachment.

19 Claims, 4 Drawing Sheets

V SHAPE BUMPER EXTENSION

BACKGROUND

Prior automotive bumpers are shown in U.S. Pat. No. 6,695,368 entitled Bumper Mount Forming Corner On End Of Beam; U.S. Pat. No. 8,414,041 entitled Automobile Bumper Arrangement and Modular Bumper System; and U.S. Patent Application Publication No. US 2009/0160204 entitled Corner Energy Absorber and Bumper System.

SUMMARY

A V shape bumper extension for a vehicle having a bumper attached to a pair of crush cans is provided. An extension member is attached to the bumper and a support member extends away from the extension member. The support member is positioned at an acute angle with respect to a crush can and includes an outer edge spaced apart from the crush can. The support member is connected to the crush can through at least one breakable attachment.

DETAILED DESCRIPTION

Figure 1:
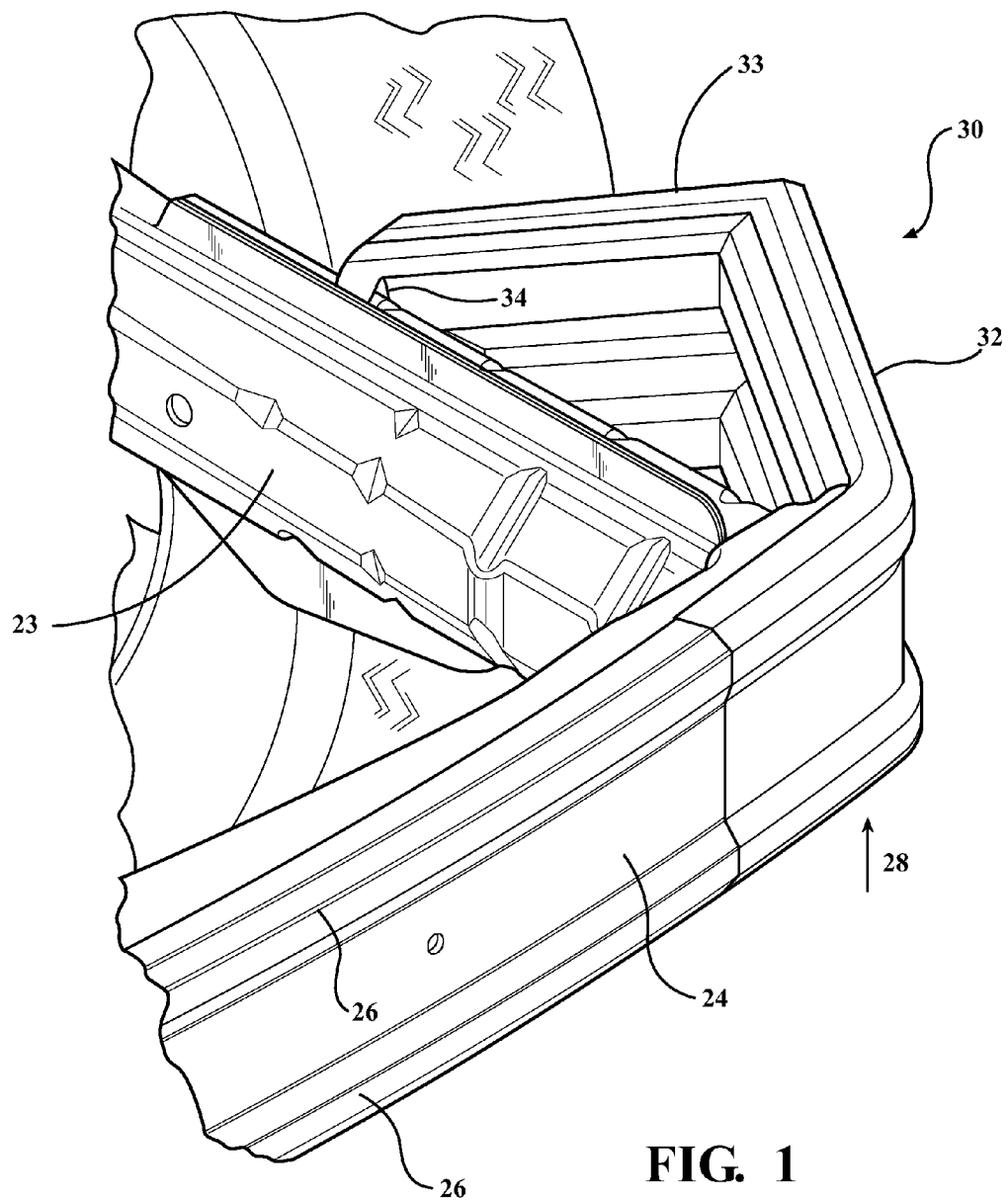
FIG. 1 is a first perspective view of a bumper extension.

It is to be understood that the following disclosed embodiments are merely exemplary of the invention that is set forth in the patent claims included herein. The figures are not necessarily to scale and some features may be exaggerated or minimized to show details of particular components. Therefore, specific structural and functional details disclosed herein are not to be interpreted as limiting, but merely as a representative basis to instruct how to employ the invention described in the claims included herein.

The exemplary embodiment described herein provides a bumper extension that provides improved performance in vehicle crash scenarios. Test performance for vehicles may be determined by a variety of different bodies which administer a variety of different tests. One such body is the Insurance Institute for Highway Safety (IIHS). One test administered by IIHS is a Small Overlap Rigid Barrier (SORB) test. Another testing body is the National Highway Traffic Safety Administration (NHTSA). NHTSA administers a full frontal impact test. A third testing body is the Research Counsel for Vehicle Repairs.

In response to testing requirements crush cans have been added to vehicles. Crush cans allow the forward section of a vehicle frame to collapse without materially damaging vehicle frame rails. Bumper assemblies need to accommodate for both large overlap and small overlap impacts. As described herein, whether an impact is large or small is measured by a percentage. An impact that directly covers 100% or 50% of the bumper (from the vehicle center line to the outer edge of the vehicle) would be classified as a large overlap impact. Likewise an impact that covers 40% of the bumper (10% from centerline to the outer edge of the vehicle) would be considered a large overlap impact. In contrast an impact that covers 25% of the bumper (25% from centerline) would be considered a small overlap impact.

A V shape bumper extension is described herein that better accommodates all of the disparate crash requirements with which vehicles must comply. The V shape bumper extension includes an extension member and a support member, which in the exemplary embodiment are arranged at approximately an orthogonal angle. The support member is held to the crush can of a vehicle by a breakable attachment. In the exemplary embodiment a gap exists between the support member and the crush can. In the exemplary embodiment the breakable attachment may be selected in such a manner to reduce noise, vibration, harshness (NVH) issues. The V shape bumper extension allows the bumper to function differently at front impacts with large overlap compared to front impacts with small overlaps. Upon a large overlap impact of sufficient force the breakable attachment breaks and the support further separates from the crush can thereby allowing the crush can to fully fulfill its design requirements. In contrast upon a small overlap impact of sufficient force the support member impacts the crush can and folds into the extension member such that adequate safety performance is achieved. By separating from the crush can in response to a large overlap impact and impacting the crush can in response to a small overlap impact the bumper assembly described herein provides two different modes of operation and better accommodates the wide variety of testing requirements.

With reference to FIGS. 1-9 wherein like elements are numbered alike there is shown a vehicle 10 with a V shape bumper extension operative to provide at least two different crash modes—a large overlapping mode and a small overlapping mode. Vehicle 10 may be a sedan, coupe, mini-van or any number of vehicle types. Vehicle 10 may be of a unibody construction 20 with frame rails 22 positioned on opposite sides of a vehicle center line 12. The vehicle includes a front 14 and wheel wells 16. A pair of identical crush cans 23 extend from the frame rails 23 at the front of vehicle 10. Crush cans 23 will deform in response to a frontal impact without causing significant damage to frame rails 23.

A bumper 24 is bolted to the crush cans 23 in a traditional manner. Bumper 24 may be of any suitable construction, but in the exemplary embodiment is of steel construction and includes bumper ribs 26. Bumper 24 includes first and second ends 28 and 29 respectively. The exemplary embodiment provides for a V shape bumper extension 30 at each of first end 28 and second end 29. Since the V shape bumper extension 30 is identical at both first end 28 and second end 29 the remaining specification will describe only a single bumper extension.

V shape bumper extension is made from two connecting parts including an extension member 32 and a support member 33. Support member 33 includes an edge 34 that is spaced apart from crush can 23 by a gap 33A. Support member 33 and extension member 32 are angled from one another at an angle Θ which in the exemplary embodiment is approximately 90 degrees. Angle Θ may range from approximately 45 to 135 degrees. Support member 33 is positioned relative to crush can 23 at an acute angle α which in the exemplary embodiment is approximately 51.5 degrees. Angle α may range from approximately 30 to 90 degrees.

Figure 2:
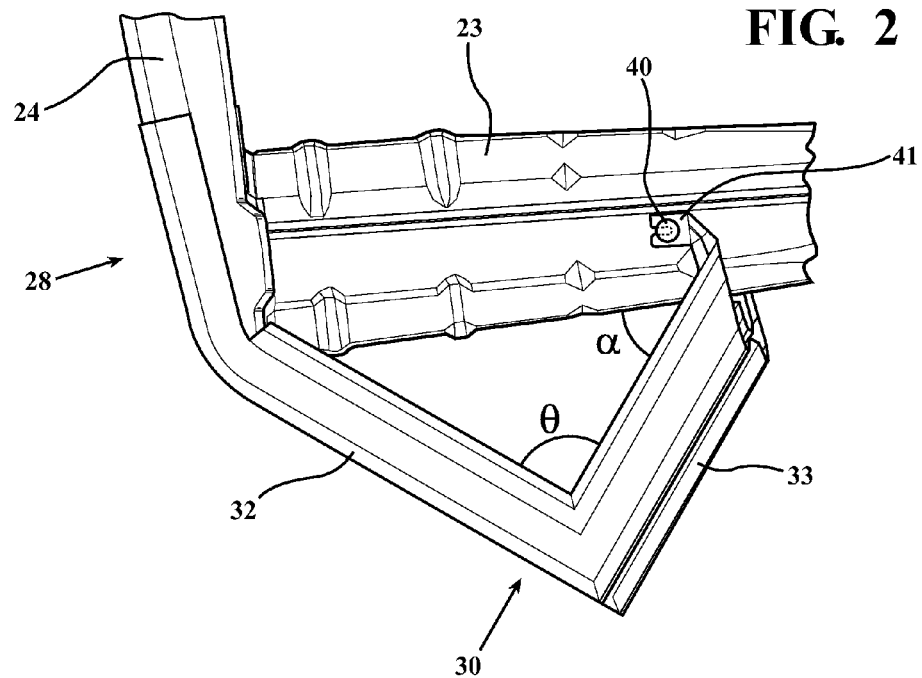
FIG. 2 is a second perspective view of a bumper extension that illustrates a breakable attachment.
Figure 3:
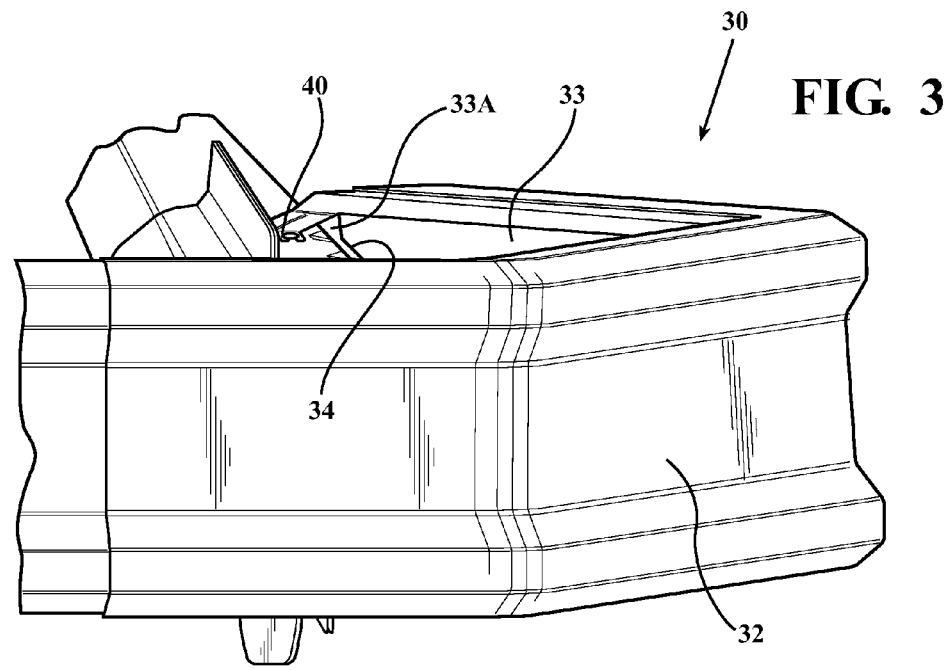
FIG. 3 is a third perspective view that illustrates a gap between a support member and a crush can.

In the exemplary embodiment support member 33 is attached to crush can 23 by a pair of breakable attachments 40 and 42. Breakable attachments 40 and 42 may be plastic in the exemplary embodiment but may be made from other materials so long as the breakable attachments 40 and 42 function as described below. Breakable attachments 40 and 42 may be positioned on a perimeter of crush can 23 as shown in FIG. 2. Breakable attachments 40 and 42 may engage tabs 41 positioned on support 33.

Figure 4:
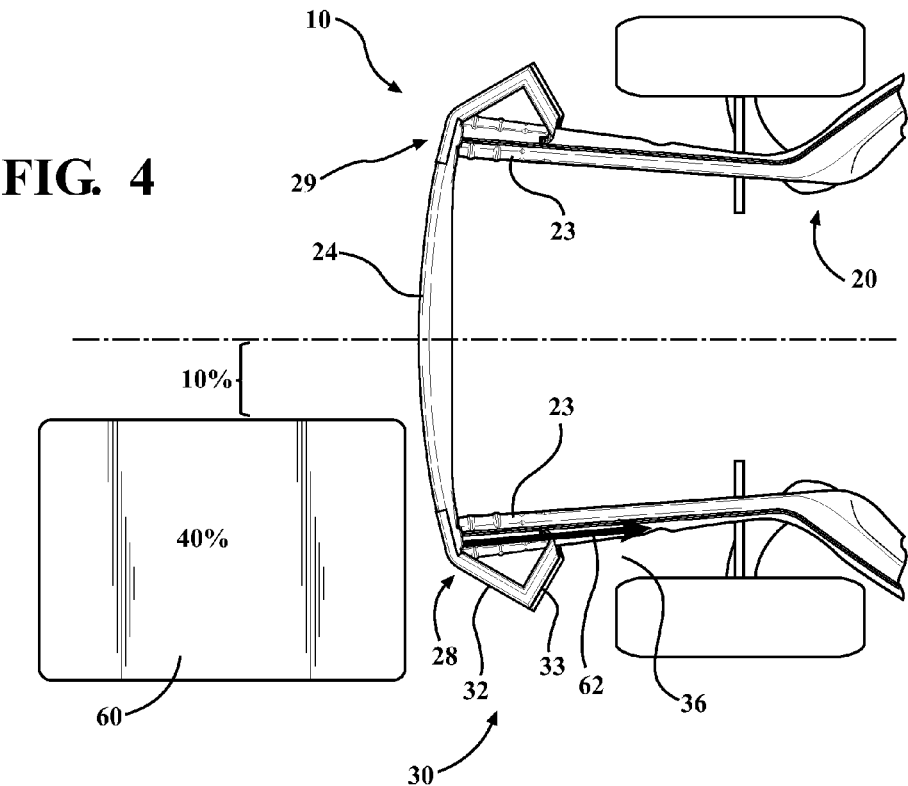
FIG. 4 is a top view illustrating a large overlapping impact with a 40% offset.
Figure 6:
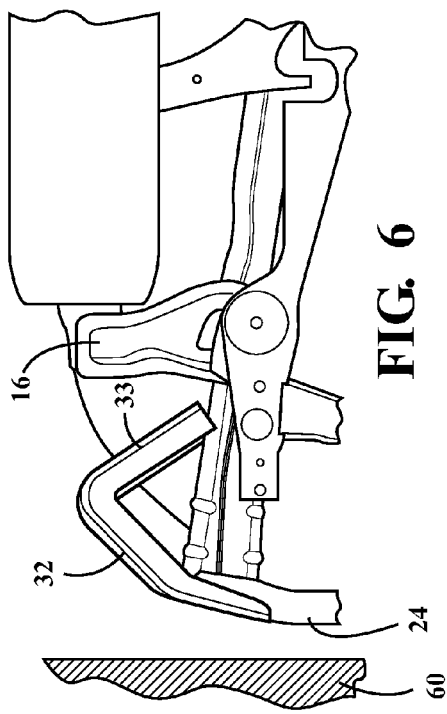
FIG. 6 is a schematic illustration of a large overlapping impact.
Figure 7:
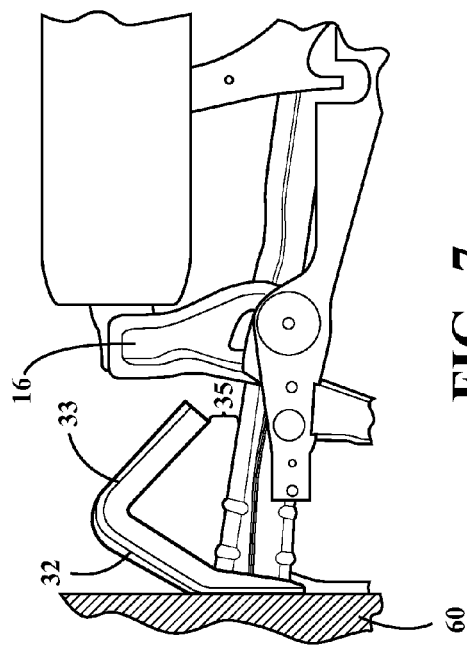
FIG. 7 is a schematic illustration of a large overlapping impact that separates a support member from a crush can.

A large overlapping impact case is shown in FIGS. 4, 6 and 7. The large overlap impact as shown in FIG. 4 is a 40% condition (also called a 40% offset), namely the impact is 10% off vehicle centerline 12. It is to be understood that a 100% full frontal impact would also be considered a large overlap condition. Upon a large overlap impact, a longitudinal force vector 62 will be imparted to the bumper. Here the breakable attachments 40, 42 will break and support member will move away from crush can 23 by a distance 35 as shown in FIG. 7. In other words the distance that exists between support member 33 and crush can 23 will increase. The length of support member 33 is chosen for each application such that when the breakable attachments 40, 42 break or otherwise disengage from support member 33, and support member 33 disengages, support member 33 will not hit a larger and stiffer structure, which, by way of non-limiting example may be vehicle wheel well 16. When support member 33 further disengages with crush can 23, crush can operates in its normal mode. Some tests provide impact speeds of 40 MPH. Thus, at a large overlap impact of 40 MPH or greater the breakable attachments may break thus allowing support member 33 to separate away from crush can 23.

Figure 5:
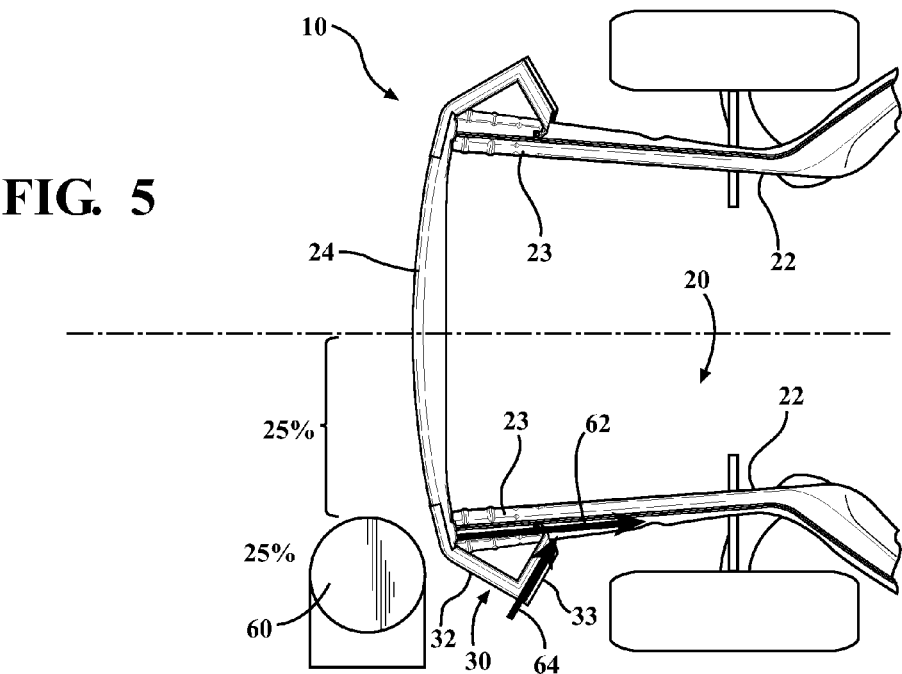
FIG. 5 is a top view illustrating a small overlapping impact with a 25% offset.
Figure 8:
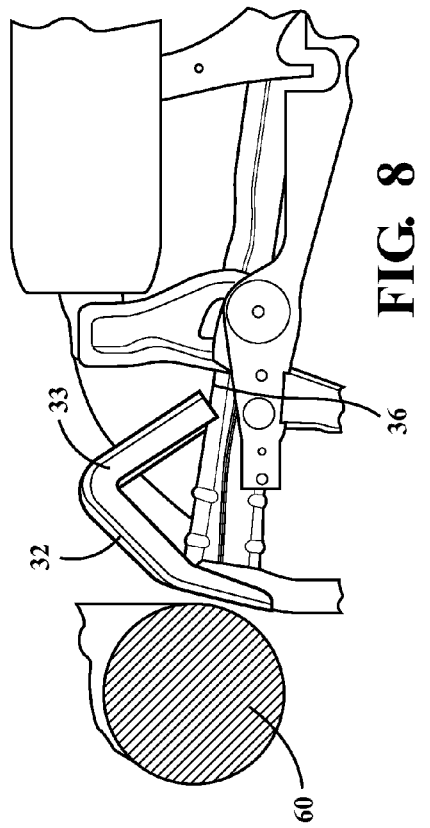
FIG. 8 is a schematic illustration of a small overlapping impact that moves a support member into a crush can.
Figure 9:
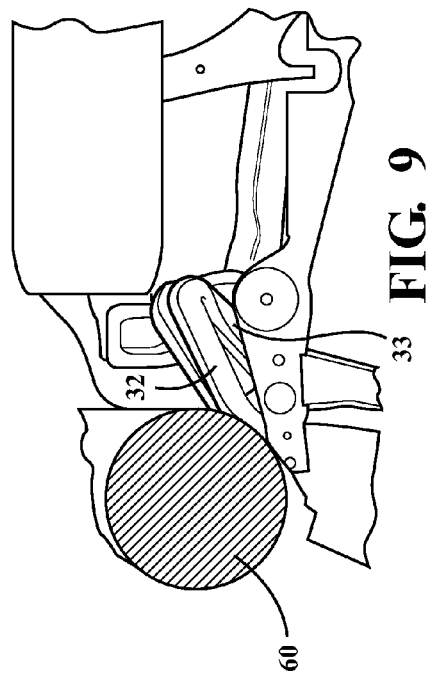
FIG. 9 is a schematic illustration of a small overlapping impact that locks a support member into a crush can.

A small overlap impact is shown in FIGS. 5, 8 and 9. The small overlap impact condition shown in FIG. 5 is at a 25% overlap condition. As shown with a 25% overlap a substantial lateral force vector 64 will be imparted to V shape extension 30 through support member 33. Lateral force vector 64 will drive support member 33 into crush can. More specifically, in the exemplary embodiment, upon a small overlap impact, V shape member 30 bends with crush can and support edge 34 is caught by a rail 36 or other catching feature such that V shape member 30 moves along with and collapses with crush can 23. The catching feature in the exemplary embodiments may be a hole on the rail 36 to block edge 34 or a small step on rail 36, designed only high enough to block edge 34 at a small overlap impact. The catch feature may also be self-locking. At a small overlap impact, the rail 36 is designed to be deformed at the position to have its shape block the substantial movement of edge 34. By having the support member lock into crush can through rail 36 additional stiffness is provided to the bumper for a small overlap impact. In an exemplary embodiment rail 23A is configured to lock to crush can 33 upon an impact of 40 MPH.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A V shape bumper extension for a vehicle having a bumper attached to a crush can, the extension comprising:
    an extension member attached to the bumper and a support member extending away therefrom; the support member positioned at an acute angle with respect to the crush can and including an outer edge spaced apart therefrom and connected to the crush can through at least one breakable attachment.

2. An extension as in claim 1 wherein the support member and extension member are at approximately a 90 degree angle.

3. An extension as in claim 1 wherein the breakable attachment is further comprised of a pair of tabs spaced apart from one another at the edge of the support member.

4. An extension as in claim 3 wherein the breakable attachments are made from plastic.

5. An extension as in claim 3 wherein the acute angle is 30 to 90 degrees.

6. An extension as in claim 1 wherein the crush can further includes a rail, where the support member locks into the rail upon a small overlap impact.

7. An extension as in claim 1 wherein the breakable attachment does not break upon on a large overlapping impact under 40 MPH.

8. An extension as in claim 1 where the breakable attachment breaks upon a large overlapping impact of over 40 MPH and the support member further separates away from the crush can.

9. An extension as in claim 1 wherein the edge of the support maintains its spaced apart relationship from the crush can upon a small overlapping impact of under 40 MPH.

10. An extension as in claim 1 wherein the edge of the support impacts the crush can and the V shape extension collapses with the crush can upon a small overlapping impact of over 40 MPH.

11. A bumper extension for a bumper on an automobile, the vehicle including a pair of frame rails having crush cans at one end and a bumper attached thereto, the bumper having a first end; the extension comprising:
    a V shape bumper extension having a support member and an extension member; the extension member rigidly attached to the first end of the bumper and the support member engaged to the crush can at an acute angle through a fixed attachment such that upon a substantially large overlapping impact the support member disengages from the crush can and upon a substantially small overlapping impact the support member is driven into the crush can;

wherein the support member includes an edge that is spaced apart from the crush can and the fixed attachment is a breakable attachment.

12. The bumper extension as in claim 11 wherein the breakable attachment comprises a pair of tabs extending away from the edge of the support member.

13. A bumper extension as in claim 12 wherein the breakable attachment breaks and the edge of the support member further separates from the crush can upon a large overlapping impact.

14. A bumper extension as in claim 13 wherein the edge of the support member impacts the crush can upon a small overlapping impact.

15. A bumper extension as in claim 12 wherein the support member and extension member are positioned at approximately a 90 degree angle with respect to one another.

16. A bumper assembly as in claim 11 wherein the crush can includes a rail that operatively catches and locks the support member upon a small overlapping impact.

17. A bumper as in claim 16 wherein the fixed attachment is made from plastic.

18. A bumper extension for a vehicle having a bumper attached to a pair of crush cans, the extension comprising:

an extension member attached to the bumper and extending therefrom collinearly and a support member extending away from the extension member at approximately a right angle; the support member positioned at an acute angle with respect to the crush can and including an outer edge spaced apart from one of the crush cans and connected to the crush can through at least one breakable attachment.

19. A bumper extension as in claim 18 wherein the crush can includes a rail operative to catch and lock the support member upon a small overlapping impact such that the V shape member and crush can collapse together upon a small overlapping impact.

* * * * *